United States Patent
Reichmann et al.

(10) Patent No.: US 9,442,269 B2
(45) Date of Patent: Sep. 13, 2016

(54) INDEPENDENTLY ADJUSTABLE MOUNT ASSEMBLY FOR TWO OPTICAL COMPONENTS

(71) Applicant: JENOPTIK Optical Systems GmbH, Jena (DE)

(72) Inventors: Lutz Reichmann, Jena (DE); Stefan Franz, Jena (DE); Marco Bornschein, Jena (DE); Matthias Bening, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 61 days.

(21) Appl. No.: 14/361,907

(22) PCT Filed: Jan. 18, 2013

(86) PCT No.: PCT/DE2013/100017
§ 371 (c)(1),
(2) Date: May 30, 2014

(87) PCT Pub. No.: WO2013/113309
PCT Pub. Date: Aug. 8, 2013

(65) Prior Publication Data
US 2014/0307340 A1 Oct. 16, 2014

(30) Foreign Application Priority Data
Jan. 31, 2012 (DE) .................. 10 2012 100 784

(51) Int. Cl.
*G02B 7/02* (2006.01)
*G02B 7/00* (2006.01)

(52) U.S. Cl.
CPC .................. *G02B 7/02* (2013.01); *G02B 7/003* (2013.01); *G02B 7/021* (2013.01)

(58) Field of Classification Search
CPC .......... G02B 7/00; G02B 7/003; G02B 7/02; G02B 7/021
USPC ........ 359/811, 813, 819, 830, 642; 310/309, 310/310, 323.01
See application file for complete search history.

(56) References Cited

U.S. PATENT DOCUMENTS

| | | |
|---|---|---|
| 5,521,764 A | 5/1996 | Balogh et al. |
| 6,191,898 B1 | 2/2001 | Trunz et al. |
| 6,457,866 B1 | 10/2002 | Scheibl |
| 6,538,829 B2 | 3/2003 | Rau et al. |
| 6,876,494 B2 | 4/2005 | Ishikawa et al. |
| 7,239,462 B2 | 7/2007 | Rau et al. |
| 7,903,353 B2 | 3/2011 | Reichmann et al. |

(Continued)

FOREIGN PATENT DOCUMENTS

| | | |
|---|---|---|
| DE | 44 00 869 C1 | 3/1995 |
| DE | 199 01 295 A1 | 7/2000 |

(Continued)

*Primary Examiner* — Tuyen Tra
(74) *Attorney, Agent, or Firm* — Muncy, Geissler, Olds & Lowe, P.C.

(57) ABSTRACT

The invention relates to a mount assembly comprising two monolithic mounts in which optical components (1.3, 2.3), which can be translationally and rotationally adjusted in relation to each other, are held. The adjustment movements can be carried out without influencing one another, by providing one of the mounts as a rotational mount (1) and the other as a translational mount (2), which substantially only permit a translational and/or a rotational movement within the adjustment region provided.

12 Claims, 3 Drawing Sheets

(56) References Cited

U.S. PATENT DOCUMENTS 8,547,652 B2 10/2013 Bornschein
2013/0182341 A1 7/2013 Reichmann et al.

FOREIGN PATENT DOCUMENTS

| DE | 199 51 176 A1 | | 4/2001 |
|---|---|---|---|
| DE | 100 39 712 A1 | | 2/2002 |
| DE | 10 2007 030 579 A1 | | 1/2008 |
| DE | 102008040218 | * | 1/2009 |
| DE | 10 2008 029 161 B3 | | 10/2009 |
| DE | 10 2008 063 223 B3 | | 9/2010 |
| DE | 10 2010 035 223 B3 | | 12/2011 |
| EP | 1 577 693 A2 | | 9/2005 |
| JP | 2001-021830 A | | 1/2001 |

* cited by examiner

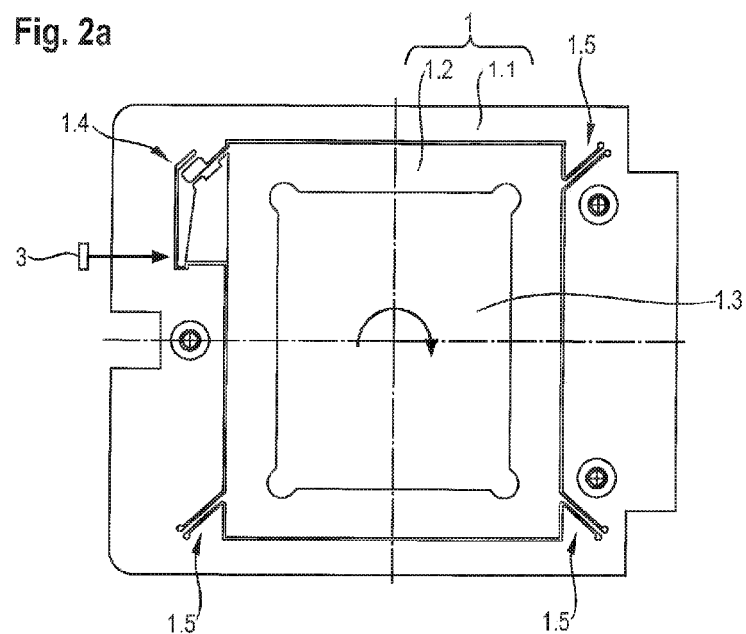
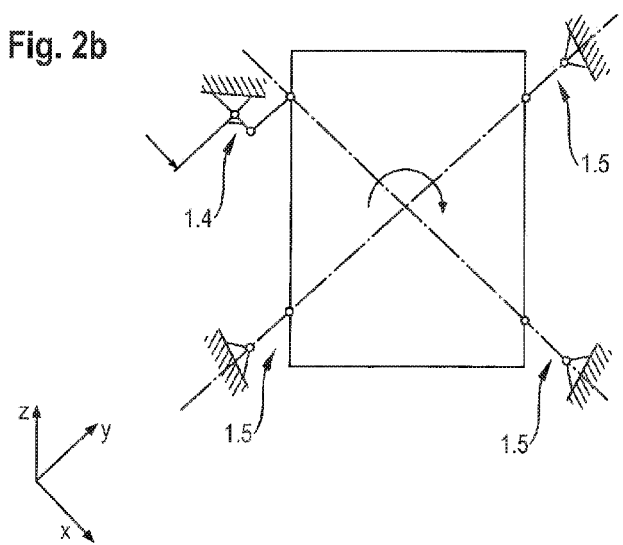

INDEPENDENTLY ADJUSTABLE MOUNT ASSEMBLY FOR TWO OPTICAL COMPONENTS

This nonprovisional application is a National Stage application of International Application No. PCT/DE2013/100017, which was filed on Jan. 18, 2013, and which claims priority to German Patent Application No. 10 2012 100 784.5, which was filed in Germany on Jan. 31, 2012, and which are both herein incorporated by reference.

BACKGROUND OF THE INVENTION

1. Field of the Invention

The invention relates to an adjustable mount assembly in which two optical components can be adjusted in relation to each other very precisely, translationally in an x-y plane perpendicular to an axis of rotation and rotationally about said axis of rotation, which is advantageously the common optical axis of the two optical components. Such a mount can be used in particular for mounting so-called spatial filters, in which a micro lens array and an aperture diaphragm array arranged one behind the other have to be oriented so as to be adjusted in relation to each other.

2. Description of the Background Art

U.S. Pat. No. 6,876,494 B2 discloses a device with which light is projected onto a wafer in a predefined structural pattern, by the light being modulated spatially via micro optical components. For the quality of the modulation, amongst other things, the highly accurate adjustment of a micro lens array belonging to the device with respect to an aperture diaphragm array corresponding thereto, which is arranged after the micro lens array in the direction of the optical axis of the micro lens array, is of importance. The optical axis of the micro lens array is understood to be a central axis from the multiplicity of individual optical axes of the individual lenses of the micro lens array.

The device disclosed in U.S. Pat. No. 6,876,494 B2 is based on a prior art, described in JP 2001-21830, according to which, in a generically equivalent device, an aperture diaphragm array is positioned in relation to a micro lens array. It is explained that the micro lens array used in JP 2001-21830 comprises micro lenses having a small numerical aperture and a focal length of 5 mm, for which reason exact positioning in the direction of the optical axis is not to be the subject matter of these considerations. If, however, use is made of a micro lens array with micro lenses of a large numerical perture and a focal length of approximately 250-300 µm, then highly accurate positioning of the aperture diaphragm array in the direction of the optical axis in relation to the micro lens array is necessary, so that the individual components of the light focused by the micro lenses are focused in the aperture diaphragms.

In order to position the micro lens array and the aperture diaphragm array at an exactly predefined distance in relation to each other, according to U.S. Pat. No. 6,876,494 B2 it is proposed to form on the micro lens array or on the aperture diaphragm array at least one projection toward the other array, which projection has a predefined height in the direction of the optical axis and determines the distance between the arrays. Thus, the relative position of the arrays in relation to each other in the direction of the optical axis can be set accurately.

Instead of the at least one projection, a spacer having a predefined thickness can also be inserted between the micro lens array and the aperture diaphragm array.

In relation to the necessity for accurate positioning, also perpendicular to the optical axis (following adjustment in one plane), no information can be gathered from U.S. Pat. No. 6,876,494 B2.

The adjustment in one plane is necessary in order to bring the individual optical axes of the individual lenses of the micro lens array into coincidence with the axes of symmetry of the apertures of the aperture diaphragm array. For the purpose of adjustment in one plane, a relative movement is necessary which has both translational components (travels) in an x-y plane perpendicular to the optical axis and a rotational component (angle) about the optical axis, the travels and angles being only tiny.

Such adjusting movements of the two arrays in relation to each other are afflicted by friction in the event of moderate contact over formed projections or a spacer and are therefore afflicted by stick-slip, which makes a precise, deterministic adjustment in an order of magnitude of 0.05 µm, as is intended by the applicant, very difficult.

Adjustable mounts for optical components, which permit an adjustment in a plane perpendicular to the optical axis of an optical system, generally comprise an outer mount part, which is firmly connected to the housing of the optical system or is a constituent part of the housing, and an inner mount part, which carries the optical component and can be displaced and rotated in relation to the outer mount part in the plane by means of actuating elements.

Adjustable mounts are known in which the mount parts are individual parts which, following the adjustment, have to be fixed in relation to each other, and those in which the mounts are produced monolithically and the mount parts remain in the adjusted position in a self-locking manner without these having to be fixed.

As a rule, the first-named type of mounts is used for relatively large adjustment travels with lower precision, and the second-named type of mounts is used for small actuating travels with high precision.

DE 44 00 869 C1 discloses an adjustable mount (called a device for the lateral adjustment of lenses within a high-power objective there), in which the mount parts are individual parts. The mount comprises an inner mount part (called a lens mount there) and an outer mount part (called a first mount there), which are connected to each other via a detachable clamping device acting axially in a force-fitting manner.

The inner mount part, in which the lens is held, is held within the outer mount part, which can be fitted into an objective housing, by pressing forces which act exclusively parallel to the optical axis of the objective, and which, during an adjustment in a plane perpendicular to the optical axis, are partly compensated for by opposing forces, generated by piezo translators arranged in the inner mount part, so that a displacement of the inner mount part within the outer mount part is possible with action of little radial force.

The outer mount part has an inner planar face, on which the inner mount part is placed by pressure means. Advantageously, the pressure means used is a contact ring firmly connected to the outer mount part, a spring ring and an adjustment ring which is placed on the inner mount. The pressing force of the pressure means, determined by the dimensions of the adjustment ring, and also the spring force of the spring ring, is dimensioned such that the inner mount part is reliably held in its position even under mechanical loadings, e.g. during transport. As a result of the exclusive action of axial forces when fixing the inner mount ring, the possible misalignment thereof during fixing is intended to be avoided.

The opposing force acting during adjustment, produced by the piezo translators, is lower than the pressing force, so that the inner mount part is still always placed on the inner planar face by axial forces and cannot slip in the outer mount part in an undefined manner. A displacement is carried out only with action of a radial force via radially acting actuating elements. Which actuating elements are used has a substantial influence on the reproducibility of the adjustment, the precision thereof, the possible actuating travel and the user friendliness.

The arrangement of four actuating elements offset by 90° in relation to one another is advantageous. Since, in the device according to DE 44 00 869 C1, the actuating elements are not assigned any holding function and the axial pressing force to be overcome during the adjustment is low, the use of piezo translators as actuating elements proves to be particularly advantageous.

DE 10 2008 029 161 B3 discloses a monolithic mount for a lens. It comprises an annular disk, which is subdivided by slots into an inner and an outer mount part, which remain connected to one another, preferably at three points. The remaining connections, the geometric shape and size of which can in principle be implemented differently by means of the position and shape of the slots, determines the possible actuating travel and the precision of the adjustment. According to DE 10 2008 029 161 B3, the connections are formed by toggle levers which is formed of two links which, at one end, are connected to each other via a solid body joint and enclose an angle greater than 90° and less than 180° with each other, and the other ends of which are connected to the outer and the inner mount part, respectively, via solid body joints.

The solid body joints are tapered portions formed by the shape and arrangement of the slots.

As a result of the action of force on the connections (also manipulator units), the inner mount part can be displaced and rotated with respect to the outer mount part within one plane. Monolithic mounts having manipulator units implemented in other ways are known, for example from EP 1 577 693 A2 and DE 10 2007 030 579 A1. The geometry of the manipulator units (shape and dimensioning) determines the possible adjustment travel and the precision of the adjustment.

A device according to DE 10 2008 029 161 B3 is not suitable to adjust two optical components, forming an assembly, in relation to each other and to adjust the assembly in relation to a reference base, e.g. the optical axis of an optical system.

An adjustable mount in which two optical components, forming an optical assembly, can be adjusted very precisely in relation to each other over a large adjustment range and the assembly can be adjusted in relation to a reference base is described in the patent application DE 10 2010 035 223.3 (not yet published), which originates from the applicant.

The mount assembly claimed here comprises an outer mount part and an inner mount part, which together form a first adjustable mount. The outer and the inner mount part each comprise an outer and an inner mount frame, which are each connected to each other monolithically via at least three manipulator units, comprising solid body joints and actuating elements, e.g. actuating screws. They each constitute a second and a third adjustable mount. Fixed in the two inner mount parts in each case is an optical component, which can be adjusted in relation to each other within the mount assembly and jointly in relation to a reference base, specifically the outer mount frame of the outer mount part, by the actuation of the manipulators, which act on the solid body joints. Here, a micro lens array and a spatial filter array are specified as examples of the mounted optical components.

In order to permit these adjustments, firstly the inner mount part is arranged such that it can be displaced and fixed in the outer mount part in a plane perpendicular to an optical axis by means of actuating screws. Secondly, the inner mount frame of the outer mount part and the outer mount frame of the inner mount part are connected to each other via a detachable clamping device acting axially in a force-fitting manner. As a result, when the clamping device is released and the actuating screws are fixed, which means tightened, the two optical components can be adjusted in relation to each other by means of manipulation of the outer mount part and of the inner mount part or else only by means of manipulation of one of the two mount parts.

When the clamping device is fixed, which means acting axially in a force-fitting manner and clamping the inner mount part to the outer mount part, and with the actuating screws released, further, more precise adjustment of the two optical components in relation to each other is possible by means of manipulation of the inner mount part and an adjustment of both optical components relative to the reference base by means of manipulation of the outer mount part.

The drawback with this mount assembly is that, during the adjustment, the movement that is initiated has both translational and rotational components, which makes relatively long experimentation necessary.

SUMMARY OF THE INVENTION

The object of the invention is to find a mount assembly in which two mounted optical components can be adjusted in relation to each other simply and quickly. This object is achieved for a mount assembly having the features of claim 1. Advantageous embodiments are described in the sub claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2a shows a top view of a first mount part;

FIG. 2b shows a movement scheme for the first mount part according to FIG. 2a;

DETAILED DESCRIPTION

Figure 1:
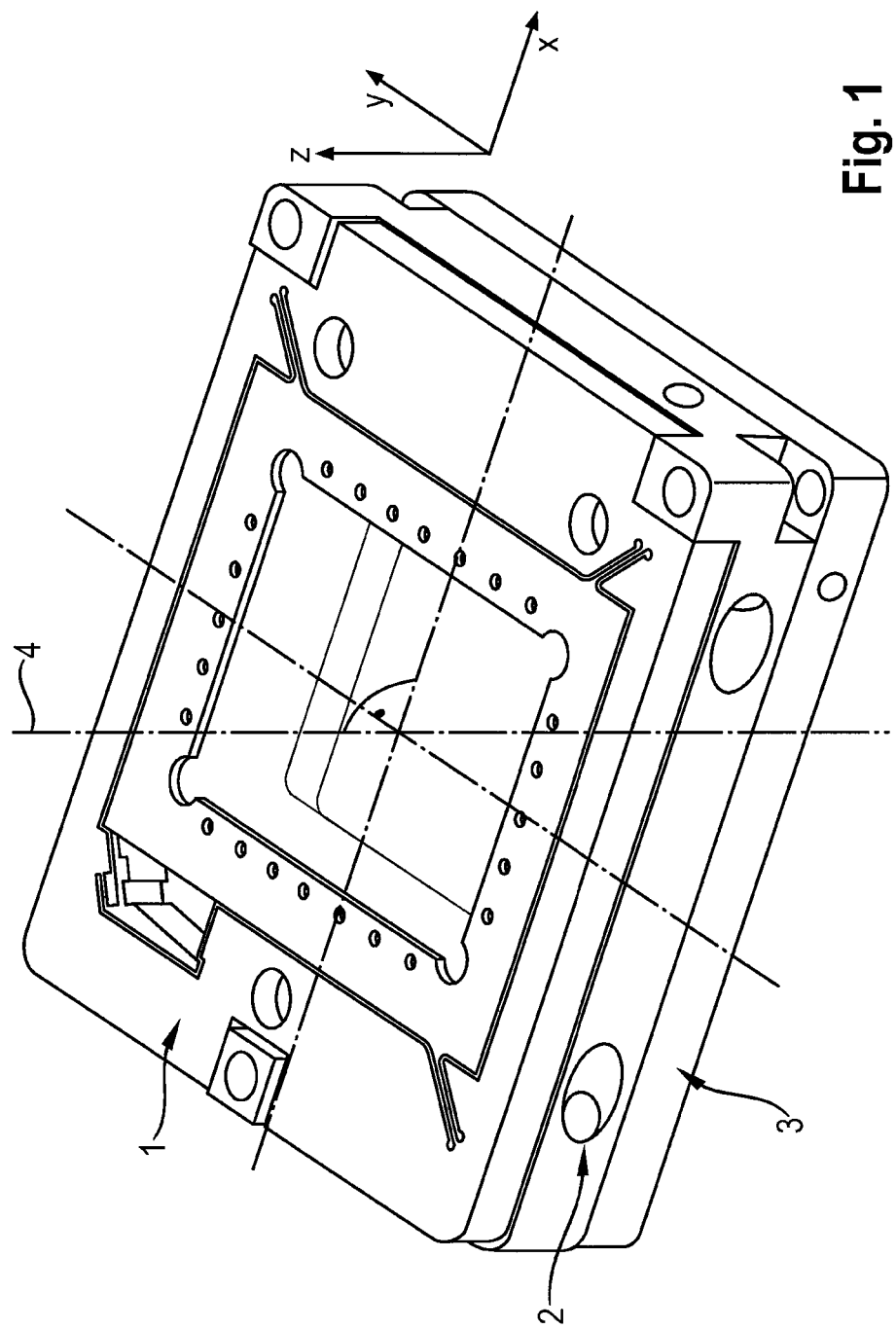
FIG. 1 shows a perspective view of a mount assembly.

A mount assembly according to the invention comprises two mounts, specifically a rotational mount 1 and a translational mount 2, which are each formed by a monolithic plate, which are subdivided by slots into an outer mount frame 1.1, 2.1, an inner mount frame 1.2, 2.2 and solid body joints 1.4, 1.5, 2.4, 2.5 joining said mount frames to each other. The inner mount frames 1.2, 2.2 can be displaced translationally in relation to each other in an x-y plane, and can be rotated about an axis of rotation standing upright on the plane.

By means of a selected implementation, combination and arrangement of the solid body joints 1.4, 1.5, 2.4, 2.5, in each case the inner mount frame 1.2, 2.2 can be moved via the manipulators thereof with respect to the outer mount frame 1.1, 2.1, specifically following a specific, predefined movement path.

The rotational mount 1 is designed such that, when an actuating travel is introduced via an actuating element 3 acting on one of the solid body joints 1.4, a virtually pure rotational movement of the inner mount frame 1.2 with respect to the outer mount frame 1.1 about an adjustment angle is effected.

For this purpose, the rotational mount 1 has a manipulable solid body joint 1.4, on which the actuating element 3 acts, and at least two, or preferably three, rigid solid body joints 1.5 forcibly deflected in the direction of the center of the rotational mount 1.

In order to convert the actuating travel into a rotational movement, the solid body joints of the rotational mount 1.4, 1.5 are implemented and arranged in relation to one another such that the interaction thereof corresponds to the movement scheme illustrated in FIG. 2*b*.

The translational mount 2 is designed such that, when an actuating travel is introduced via at least one of two actuating elements 3 each acting on one of the solid body joints 2.4, a virtually pure translation of the inner mount frame 2.2 with respect to the outer mount frame 2.1 is effected in two mutually perpendicular directions, which are designated the x and y direction below, by adjustment travels a, b. For this purpose, the translational mount 2 has two manipulable solid body joints 2.4, on which in each case one of the two actuating elements 3 acts, and at least two, or preferably three, rigid forcibly deflected solid body joints 2.5 perpendicular to the direction toward the center of the translational mount 2. In order to convert the actuating travels into a translational movement, the solid body joints of the translational mount 2.4, 2.5 are implemented and arranged in relation to one another such that the interaction thereof corresponds to the movement scheme illustrated in FIGS. 3*b* and 3*c*.

In actual fact, neither the translational movement nor the rotational movement is a pure translational or rotational movement. However, in the case of the small adjustments which are intended to be completed with the mount assembly, the respective other components are unimportant. Advantageously, the mount assembly can be used to adjust an optical component 1.3 mounted in the rotational mount, for example in the form of a micro lens array, and an optical component 2.3, then accordingly mounted in the translational mount in the form of an aperture diaphragm array, in relation to each other.

The order of magnitude of the adjustment angle range and of the adjustment travel range within which the adjustment is completed is to be made clear by using the exemplary dimensions of the two arrays specified below. The apertures of the aperture diaphragm array have a diameter of 4 µm, and the individual lenses of the micro array have a focal length of 180 µm. The spacings of the optical individual axes of the individual lenses and the axes of symmetry of the apertures in relation to one another are 40 µm in an orthogonal pattern.

The tolerance for a positional deviation of the individual axes in relation to the axes of symmetry lies in a region of 100 nm.

A mount assembly according to the invention has a translational adjustment range via adjustment travels of about 30 µm, and a rotational adjustment range via an adjustment angle of about 3.5°. The sensitivity for the adjustment is about 50 nm and 2", respectively.

In order, within the scope of these adjustment ranges, to be able to bring the two optical components to an adjusted state, the rotational mount 1 and the translational mount 2 are pre-adjusted in relation to each other before the outer mount frames 1.1, 2.1 thereof, which can be adjusted and fixed in relation to each other, are fixed in relation to each other. Provided for this purpose are suitable means, which are not the subject matter of this application. Likewise not the subject matter of this application are means which permit a setting of the spacing of the two mounts 1, 2 in relation to each other in the direction of the optical axis, in order to place the focal points of the individual lenses in the centers of the apertures with a tolerance of, for example, 10 µm.

As already explained, the solid body joints 1.4, 1.5, 2.4, 2.5 of the mount assembly can be divided into manipulable solid body joints 1.4, 2.4 and forcibly deflected solid body joints 1.5, 2.5.

The manipulable solid body joints 1.4, 2.4 are each connected to an actuating element 3 which, for example, is a piezo actuating element or an actuating screw. An actuating travel introduced via the actuating element 3 is transmitted to the inner mount frame 1.2, 2.2 as an amplified actuating movement in a step-up ratio determined by the implementation of the manipulable solid body joint 1.4, 2.4.

Figure 3A:
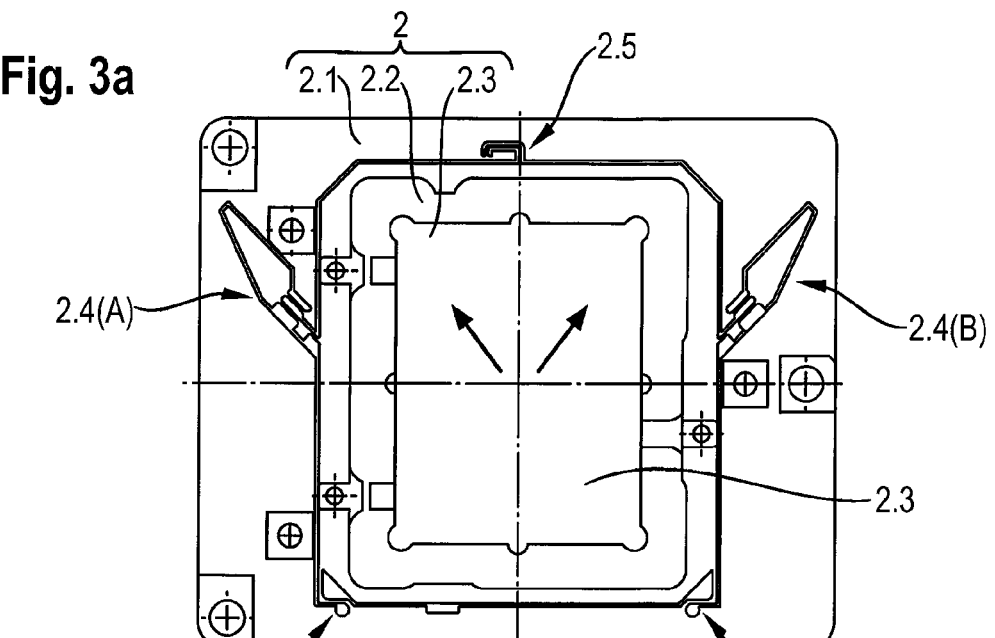
FIG. 3a shows a top view of a second mount part.
Figure 3B:
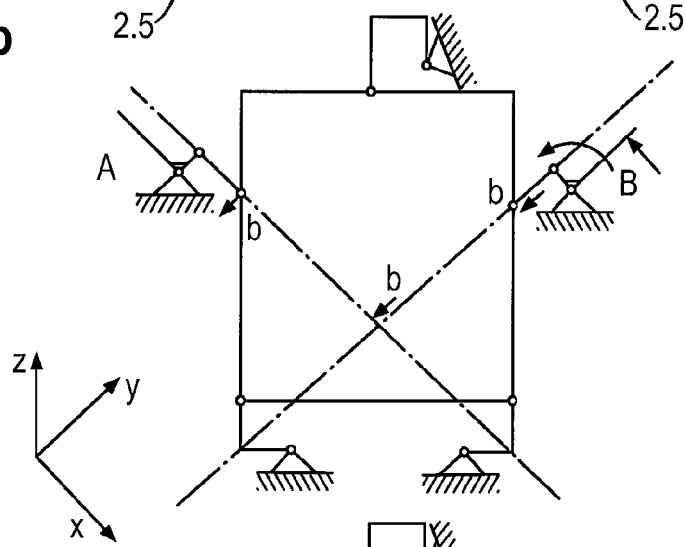
FIG. 3b shows a movement scheme for the second mount part according to FIG. 2a with a translational displacement in the y direction indicated.

In the exemplary embodiment for a mount assembly having a rotational mount 1, illustrated in FIG. 2*a*, and a translational mount 2, illustrated in FIG. 3*a*, the manipulable solid body joints 1.4, 2.4 are formed in such a way that, considered in terms of movement, they each constitute a lever rotatably mounted in the outer mount frame 1.1, 2.2, having a first free end, on which the actuating element 3 acts and a second end, which is connected to one end of a coupler, the other end of which is connected to the inner mount frame 1.2, 2.2.

The fact that an actuating travel introduced via the actuating element 3 leads firstly to a translational and secondly to a rotational adjustment of the inner mount frame 1.2, 2.2, is achieved substantially by the different implementation of the forcibly guided solid body joints 1.5, 2.5 and the arrangement thereof in relation to the direction of action of the amplified actuating movement.

The rotational mount 1 has at least two rigid forcibly deflected solid body joints 1.5 in the direction toward the center of the rotational mount 1, which are implemented as straight couplers and are arranged in relation to each other such that the imaginary extensions thereof intersect in the center of the rotational mount 1 and therefore of the optical component mounted in the rotational mount. The center of rotation of the mount assembly is located at the point of intersection formed in this way. With respect to a displacement in the direction of the straight couplers, the forcibly guided solid body joints 1.5 are rigid. Therefore, a lateral deflection of the inner mount frame 1.2 as compared with the rotation thereof about the center of rotation is prevented by a substantially higher rigidity. In order to increase the rigidity of the connection of the inner mount frame 1.2 to the outer mount frame 1.1, it is possible to provide further solid body joints 1.5, which are all oriented such that the imaginary extension thereof runs through the center of rotation.

Thus, all degrees of freedom of the inner mount frame 1.2 relative to the outer mount frame 1.1, with the exception of the rotation about the center of rotation, are restricted with adequate rigidity.

The manipulable solid body joint of the rotational mount 1.4 connects the outer mount frame 1.1 to the inner mount frame 1.2 such that the coupler thereof is arranged in a direction tangential to the center of rotation and therefore likewise defines the remaining degree of freedom of the rotation of the inner mount frame 1.2 relative to the outer mount frame 1.1 about the center of rotation. If the manipulable solid body joint 1.4 is actuated, then the coupler thereof is displaced in the tangential direction, which means that the inner mount frame 1.2 rotates about the center of rotation 1.4, 1.5, 2.4, 2.5. Ideally, the common optical axis of the two components runs through the center of rotation. In any case, the axis of rotation which runs through the center of rotation and about which the rotation takes place is an axis parallel to the common optical axis. The two components have a common optical axis only after the translational adjustment has been completed.

Figure 3C:
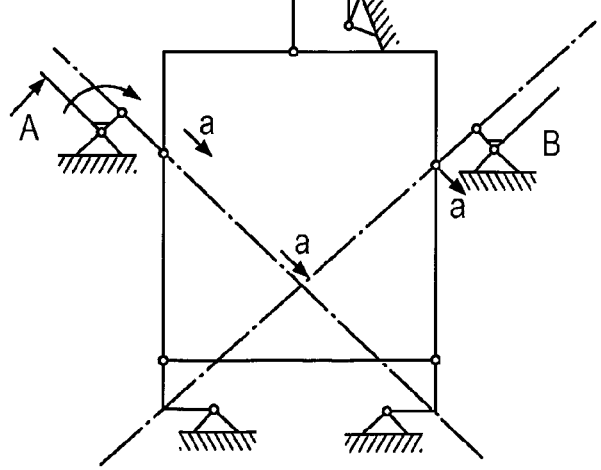
FIG. 3c shows a movement scheme for the second mount part according to FIG. 2a with a translational displacement in the x direction indicated.

The translational mount 2 has two manipulable solid body joints 2.4 (A, B), which are arranged in a plane on which the axis of rotation 4 stands upright, and the respective directions of action of which (a, b) lie in this plane and are perpendicular to each other, in this regard see FIGS. 3a 3c. At least two forcibly deflected solid body joints 2.5 additionally connect the outer mount frame 2.1 to the inner mount frame 2.2. The forcibly deflected solid body joints 2.5 are rigid in a direction perpendicular to the direction of the center of the translational mount 2. They are implemented in such a way that, in terms of their interaction, they exhibit approximately equal rigidity and therefore preferential directions in the directions of action a, b of the two manipulable solid body joints 2.4. In constructional terms, this is achieved by the forcibly deflected solid body joints 2.5 being implemented as angled couplers, preferably having equally long limbs and enclosing a right angle with each other.

Preferably, each manipulable solid body joint of the translational mount 2.4 is assigned a forcibly guided solid body joint 2.5 such that the extension of the straight couplers of the manipulable solid body joints 2.4 each run as a line of symmetry through the angled couplers.

If, for example, the manipulable solid body joint 2.4-A is actuated, see FIG. 3c, the inner mount frame 2.2 is displaced along the direction of action a at the attachment point of the manipulable solid body joint 2.4-A. The non-actuated manipulable solid body joint 2.4-B simultaneously acts like a forcibly deflected solid body joint 2.5 and guides the inner mount frame 2.2 in the direction of action a, while it blocks the preferred direction of the interacting forcibly deflected solid body joints 2.5 at right angles to the actuated direction of action, which means the direction of action b. Since, in their interaction, the forcibly deflected solid body joints 2.5 have only one remaining preferred direction along the direction of action of the actuated manipulable solid body joint, this, in interaction with the non-actuated manipulable solid body joint, e.g. 2.4-B, leads to a virtually exclusively translational movement along the direction of action a of the actuated manipulable solid body joint 2.4-A. The same is true in an analogous way with respect to the direction of action b in the event of actuation of the manipulable solid body joint 2.4-B.

As a result of arranging the manipulable solid body joints 2.4 at an angle of 90° in a plane, which means that the extensions of the couplers thereof intersect at an angle of 90° in the center of the translational mount 2 when not deflected, two translational directions of movement x, y, which can be considered as orthogonal to each other in the order of magnitude of the manipulation to be carried out, are provided.

It should expressly be pointed out that the preceding description of the arrangement of the solid body joints in relation to one another relates to a non-deflected mount assembly, that is to say the rotational mount 1 and the translational mount 2 are each in a non-clamped state. An advantage of a mount assembly according to the invention that is important to the invention resides in the decoupling of the adjustment movements in a plane into translational and rotational movements, it being possible for these to be carried out uninfluenced by each other. As a result, the adjustment can be carried out more simply and more quickly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. An independently adjustable mount assembly for adjusting two optical components in relation to each other, having a rotational mount and a translational mount, wherein
   a) the rotational mount and the translational mount each comprise an outer mount frame and an inner mount frame, which are each connected to each other monolithically via manipulable solid body joints arranged in a plane perpendicular to an axis of rotation, and at least two forcibly deflected solid body joints, there are actuating elements for manipulating the manipulable solid body joints, and in each case an optical component is fixed in the inner mount frame,
   b) the rotational mount has exactly one of the manipulable solid body joints, on which one of the actuating elements acts, the forcibly deflected solid body joints of the rotational mount are implemented to be rigid in the direction toward the center of the rotational mount and this manipulable solid body joint and the forcibly deflected solid body joints of the rotational mount are designed and arranged in relation to one another such that, when an actuating travel is introduced via this actuating element, a rotation of the inner mount frame thereof with respect to the outer mount frame thereof by an adjustment angle about the axis of rotation is effected,
   c) the translational mount has exactly two of the manipulable solid body joints, on which in each case one of the actuating elements acts, the forcibly deflected solid body joints of the translational mount are rigid in a direction perpendicular to the direction toward the center of the translational mount, and these manipulable solid body joints and the forcibly deflected solid body joints of the translational mount are designed and arranged in relation to one another such that, when an actuating travel is introduced via a first of the two actuating elements thereof onto one of the manipulable solid body joints thereof, a translation of the inner mount frame thereof with respect to the outer mount frame thereof about an adjustment travel in the x direction is effected and, when an actuating travel is introduced via a second of the two actuating elements thereof onto another of the manipulable solid body joints thereof, a translation of the inner mount frame thereof with respect to the outer mount frame thereof about an adjustment travel in the y direction is effected, and the x direction and the y direction are orthogonal to each other and to the optical axis, and d) the outer mount frame of the rotational mount and the outer mount frame of the translational mount are connected to each other such that they can be adjusted and fixed in relation to each other.

2. The mount assembly as claimed in claim 1, wherein the manipulable solid body joints are formed in such a way that, considered in terms of movement, they each constitute a lever rotatably mounted in the outer mount frame, having a first free end, on which the actuating element acts and a second end, which is connected to one end, of a coupler, the other end of which is connected to the inner mount frame.

3. The mount assembly as claimed in claim 2, wherein the rotational mount has at least two forcibly deflected solid body joints, which are implemented as straight couplers and are arranged in relation to each other such that the imaginary extensions thereof intersect in the center of the rotational mount.

4. The mount assembly as claimed in claim 2, wherein the manipulable solid body joint of the rotational mount connects the outer mount frame to the inner mount frame such that the coupler thereof is arranged in a direction tangential to the center of rotation.

5. The mount assembly as claimed in claim 2, wherein the manipulable solid body joints of the translational mount are arranged in relation to one another such that extensions of the couplers thereof intersect at an angle of 90°.

6. The mount assembly as claimed in claim 2, wherein the forcibly deflected solid body joints of the translational mount are implemented as angled couplers.

7. The mount assembly as claimed in claim 6, wherein the couplers have equally long lever arms, which enclose a right angle with each other.

8. The mount assembly as claimed in claim 7, wherein each manipulable solid body joint of the translational mount is assigned a forcibly guided solid body joint such that the extension of the couplers of the manipulable solid body joints each run as a line of symmetry through the angled couplers.

9. An independently adjustable mount assembly, comprising:
a rotational mount; and
a translational mount,
wherein the rotational mount and the translational mount each comprise an outer mount frame and an inner mount frame, which are connected by manipulable solid body joints and at least two forcibly deflected solid body joints, and actuating elements for manipulating the manipulable solid body joints,
wherein the rotational mount has exactly one manipulable solid body joints, on which one of the actuating elements acts, the forcibly deflected solid body joints of the rotational mount being implemented to be rigid in the direction toward the center of the rotational mount,
wherein the translational mount has exactly two of the manipulable solid body joints, on which in each case one of the actuating elements acts, the forcibly deflected solid body joints of the translational mount being rigid in a direction perpendicular to the direction toward the center of the translational mount; and
wherein the outer mount frame of the rotational mount and the outer mount frame of the translational mount are connected to each other such that they can be adjusted and fixed in relation to each other.

10. The mount assembly as claimed in claim 9, wherein the mount assembly is used for adjusting two optical components in relation to each other, and one of the two optical components is a micro lens array, and the other optical component is an aperture diaphragm array.

11. The mount assembly as claimed in claim 10, wherein each lens of the micro lens array has a focal length of 180 µm, and an aperture of the aperture diaphragm array has a diameter of 4 µm.

12. The mount assembly as claimed in claim 9, wherein a translational adjustment range is 30 µm, and a rotational adjustment range is 3.5°.

* * * * *